Patented Jan. 27, 1942

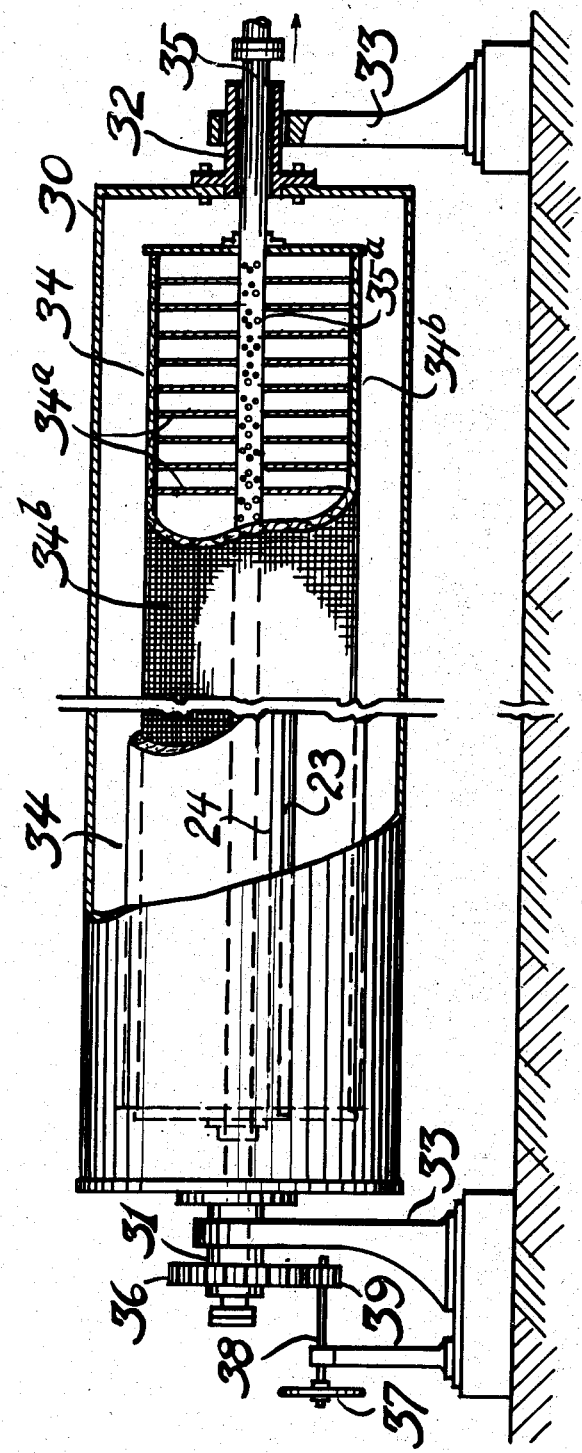

2,271,301

UNITED STATES PATENT OFFICE 2,271,301

FILTER APPARATUS

Herbert H. Moor, Moore Township, Lambton County, Ontario, Canada, assignor to Standard Oil Development Company, a corporation of Delaware Application November 30, 1939, Serial No. 306,810

4 Claims. (Cl. 210—201)

The present invention relates to an apparatus for filtering liquids containing solidifiable materials. More particularly, it relates to a filtering apparatus for the continuous operation in the removal of hydrocarbon waxes from a waxy oil. It is an object of the invention to provide a rotary, vacuum filter which will be readily adaptable for use with feed stocks of varying characteristics, requiring a wide range of filtering and washing conditions.

The invention and its objects may be fully understood from the following specification when read in conjunction with the accompanying drawings, in which—

Fig. 4 is a semi-diagrammatic view partly in section, of an alternate construction.

Figure 1:
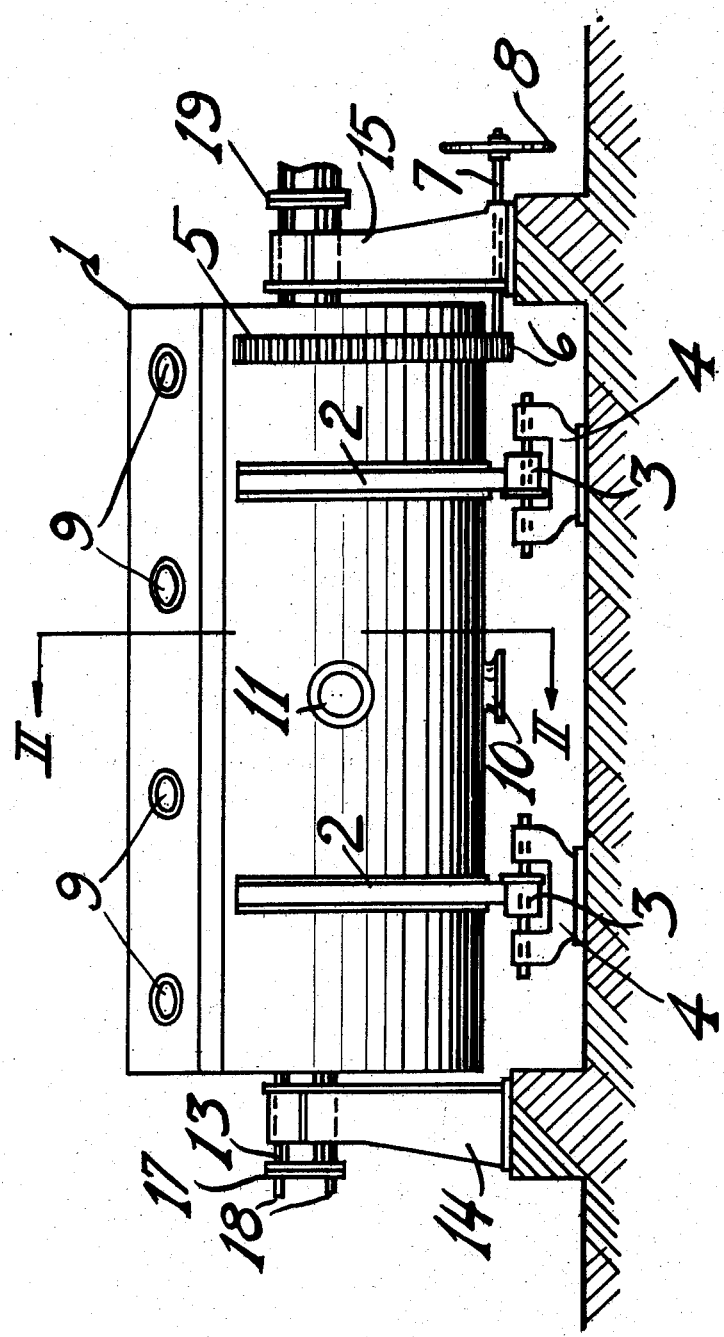
Fig. 1 is a side elevational view of a filter apparatus according to the invention.
Figure 2:
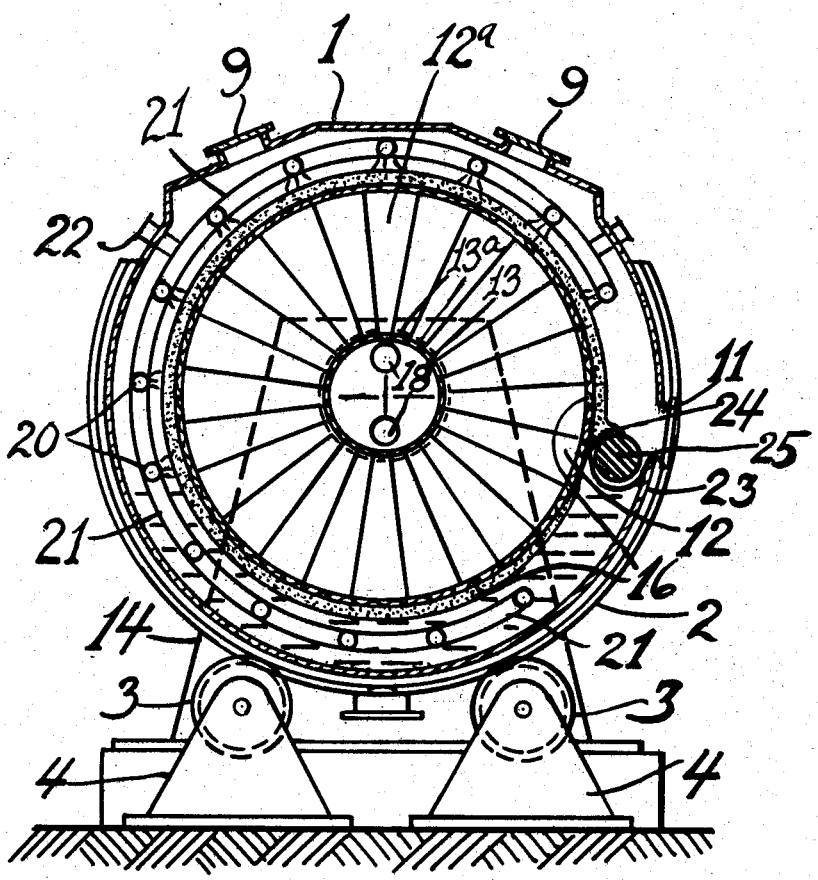
Fig. 2 is a sectional view through the apparatus taken along the line II—II of Fig. 1.
Figure 3:
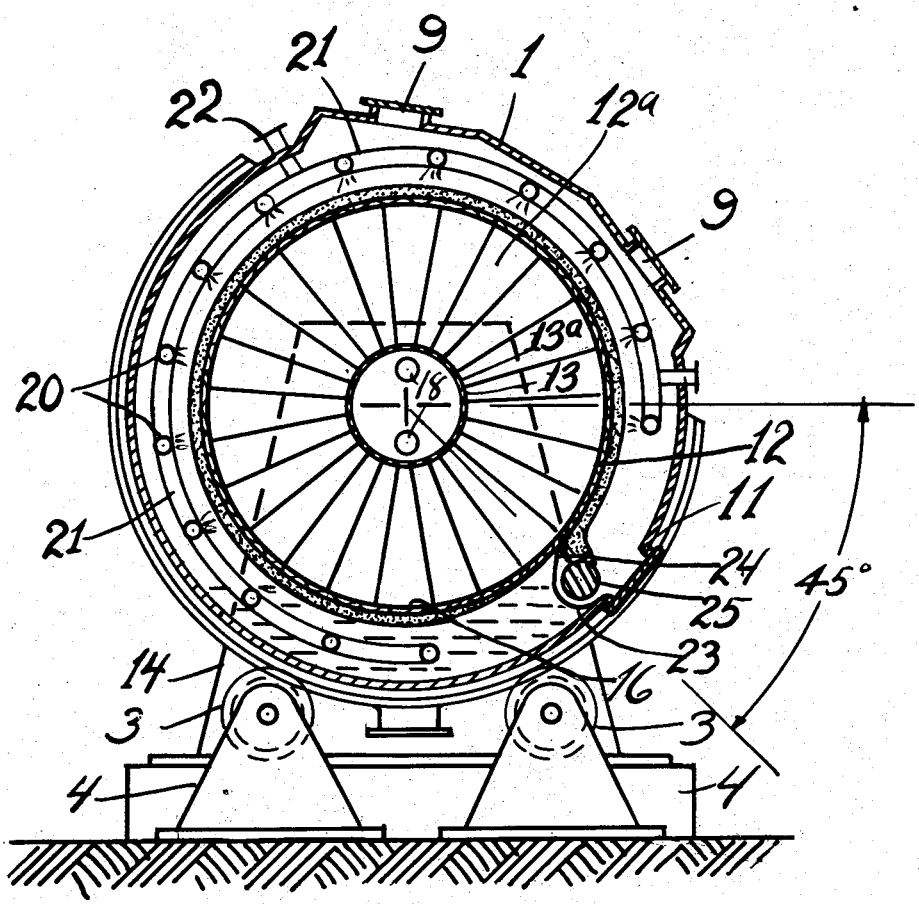
Fig. 3 is a similar view, the filter case having been rotated.

In the Figs. 1, 2 and 3, the numeral 1 designates the outer case of a filter, the case 1 being rotatably supported by means of arcuate T-rail members 2 and flanged roller members 3 carried by foundation supports 4. An arcuate rack member 5 is provided at one end of the case, and is in engagement with a pinion 6 turned by means of the shaft 7 and wheel 8. If desired, a convenient and suitable form of power drive may be substituted for the hand wheel 8. The case 1 is also provided with observation ports 9 and inlet and outlet connections 10 and 11 respectively. These connections 10 and 11 are provided to receive flexible conduits, not shown.

Within the case 1, as illustrated in Fig. 2, a filter drum 12 is suitably disposed on a hollow shaft 13 which extends outwardly at each end through the end portions of the case 1, suitable sealing means being provided between the shaft and the shaft openings, and the case 1, element 12 and shaft 13 having a common longitudinal axis. The outer ends of the shaft 13 are supported by bearing members 14 and 15, the pinion gear shaft 7 being extended through and supported in the support 15.

The filter drum 12 is of generally conventional construction and preferably is of sectional type, each section 12a communicating with the interior of the shaft 13 by suitable means, such as by perforations 13a in the shaft wall, valve means being provided as required to shut off certain series of sections from the shaft. The drum as shown, is enclosed with the usual filter blanket 16, on which a solidifiable material may accumulate. Filtrate which may be drawn into the shaft 13, in operation, may be removed from the shaft by way of a valved fitting 17 at one end of the shaft, provided with rigid or flexible conduit connections 18. The other end of the shaft is closed and should be adapted for connection to a source of power for rotary movement as by the flanged member 19.

Above the filter blanket a plurality of conduit members 20 are supported in the case in spaced circumferential relation to the drum 12. These conduits may be provided with perforations or nozzles opening toward the filter drum surface for the discharge of a washing liquid supplied thereto by way of a manifold conduit 21, the conduit having an inlet connection 22 opening through the case and provided for attachment of a flexible conduit, not shown. In this form, each conduit 20 is preferably valved so as to permit certain conduits to be closed off as desired.

As a means to remove filtered solid material from the drum continuously, a trough 23 is secured to the inner surface of the case adjacent the discharge port 11. This trough extends toward the filter surface 16 and is in contact therewith by means of a substantially resilient knife edge 24. In the trough 23 it is desirable to provide a means, such as a rotatable scroll 25, for positively moving the solid material toward the port 11.

As may be noted, the construction of the apparatus, according to the foregoing description, is substantially similar to more conventional structures, except for the provisions made for variable operation without structural alteration of the arrangement of apparatus elements. Likewise, in operation, the procedure is in most respects quite conventional.

For example, when operating with a waxy hydrocarbon oil such as a Rodessa residual oil, a comparatively long period of contact with the feed stock is required. In such circumstance, referring to the construction shown in Figs. 1, 2 and 3, the case 1 may be adjusted by the hand wheel 8, to a position substantially as in Fig. 2, and the case filled with liquid as shown. In this position, a substantial portion of the filtering surface is in contact with the liquid in the case. Those conduits 20 which may be submerged in the liquid may be shut off from the manifold supply conduit 21.

Suction applied to the filter sections through connections 18 and the shaft 13, draws liquid through the filter blanket 16, on which is deposited the solid materials carried by the liquid. The solid material forms a cake which is held to blanket by adhesion and suction, and is carried past the conduits 20, being there submitted to a bath of a suitable wash liquid. As the filter cake approaches the knife edge 24, one or two sections may be released from suction in the manner previously indicated, and, then will be engaged by the knife edge, and the cake peeled from the blanket to fall into the trough 24 from whence it is continuously removed through the port 11 with the aid of the flow of wash liquid and the scroll 25.

By reason of its adaptability, this filter apparatus may be quickly converted to operation with a feed stock having quite dissimilar characteristics, and requiring a different filtering time. The changeover may be made with only minor adjustments of the position of the filter case and possibly opening of the previously closed wash conduits.

For example, if the feed material should be changed to a Rodessa raffinate, the case 1 would be rotated to a position substantially as shown in Fig. 3. In this instance, the depth and quantity of liquid fed to the case would be less and the filter surface would be in contact therewith for a shorter period, with a longer period of washing, otherwise, the operation of the apparatus would be unchanged.

As an illustration of the variability of the apparatus, the following data is cited with respect to the operations on Rodessa residual and Rodessa raffinate feed materials:

| Stock | Filtering time in seconds | Washing time in seconds | Total time in seconds |
| --- | --- | --- | --- |
| Rodessa residual | 88 | 80 | 168 |
| Rodessa raffinate | 15 | 90 | 105 |

In Fig. 4, another form of construction is illustrated, in which the filter case 30 is provided with hollow trunnion members 31 and 32 which are secured integrally of the case ends, and open therethrough. The trunnions 31 and 32 are mounted for rotational movement in the trunnion supports 33. Within the case 30, a filter element 34 is disposed in substantially concentric relation to the case by means of the hollow shaft 35. As in the structure illustrated in Figs. 1 to 3 inclusive, the filter element 33 is preferably of the sectional type, being composed of a plurality of sections 34a covered by a filter blanket 34b. The hollow shaft 35 communicates with the several sections 34a, as by means of openings 35a. The shaft 35 extends outwardly from the ends of the filter element 34, concentrically through the ends of case 30 and the trunnion members 31 and 32. As shown, one end of the shaft 35 is capped while the other end is suitably provided for coupling with an outlet pipe, not shown. The trunnion members 31 and 32 may both be equipped to transmit rotational movement to the case 30, but in the figure, only trunnion member 31 is so equipped. For this purpose, a ring gear 36 is secured to the trunnion member 31. The case may be suitably rotated by means of a suitable gear train and power means, or as shown, by hand wheel 37 acting through the shaft 38 and the gear 39 meshed with the ring gear 36.

In all general principles, the operation of the apparatus according to Fig. 4, is similar to that of the apparatus shown in Figs. 1, 2 and 3.

Obviously various other changes and modifications of the apparatus may be made without departing from the broad concept of the invention, and its scope is therefore not to be considered as limited by anything set forth for the purpose of illustration, but only by the appended claims.

It is claimed:

1. A filter structure comprising a rotatable filter case, a rotatable filter element in said case having a common longitudinal axis, scraper means longitudinally disposed within said case in substantially resilient surface contact with the filter element and solidly secured to said rotary filter case, and rotatable mounting means for the filter case providing for arcuate movement of the case about said common axis whereby the elevation of said scraper is variable with respect to the elevation of said common longitudinal axis.

2. A filter structure comprising a rotatable filter case, a rotatable filter element in said case having a common longitudinal axis, a collecting trough longitudinally disposed along the inner face of said case and solidly secured to said rotary filter case, said trough having a substantially resilient free edge in surface contact with said filter element, and a rotatable mounting means for the filter case, exteriorly of the case, providing for arcuate movement thereof about said common axis, whereby the elevation of said trough is variable with respect to the elevation of said common longitudinal axis.

3. In a filter structure, a rotatable case, rotatable supports for said case, a filter element within said case having a common longitudinal axis, hollow shaft means common to said axis extending through the case ends and supporting said element for rotating movement, scraper means for removing solid filtered material from the filter element, said means disposed on the inner surface of said case in parallel relation to said axis, an inlet to said case for filterable material, an outlet from said case for solid filtered material, an outlet through said hollow shaft means for liquid filtrate, and means for rotating the case and scraper means with reference to said filter element and the common axis.

4. A filter structure, comprising a filter case, a hollow trunnion member integrally of said case at each end, concentric therewith and rotatably supported by spaced supports therefor, means engaging at least one of said trunnion members for rotation of the case thereby, a substantially cylindrical filter element concentrically disposed within the case, a hollow shaft member for said filter element provided for communication interiorly with the element, said shaft extending outwardly and concentrically through said case and hollow trunnions, scraper means for removing solid filtered material from the filter element, said means being disposed on the inner surface of said filter case in parallel relation to the filter element, a means for rotating the shaft and filter element, and a means for independently rotating said filter case.

HERBERT H. MOOR.